(12) United States Patent
Iwasaki et al.

(10) Patent No.: US 12,388,769 B2
(45) Date of Patent: Aug. 12, 2025

(54) RESOURCE ALLOCATION DEVICE AND RESOURCE ALLOCATION METHOD

(71) Applicant: Mitsubishi Electric Corporation, Tokyo (JP)

(72) Inventors: Akiko Iwasaki, Tokyo (JP); Kenichi Nakura, Tokyo (JP); Takeshi Suehiro, Tokyo (JP); Fumihiko Tano, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/641,826

(22) Filed: Apr. 22, 2024

(65) Prior Publication Data

US 2024/0275739 A1  Aug. 15, 2024

Related U.S. Application Data (63) Continuation of application No. PCT/JP2021/045848, filed on Dec. 13, 2021.

(51) Int. Cl.
*H04L 47/70* (2022.01)
*H04L 47/74* (2022.01)
*H04L 47/78* (2022.01)

(52) U.S. Cl.
CPC .......... *H04L 47/821* (2013.01); *H04L 47/741* (2013.01); *H04L 47/781* (2013.01)

(58) Field of Classification Search
CPC .... H04L 47/821; H04L 47/741; H04L 47/781

USPC .......................................................... 709/226
See application file for complete search history.

(56) References Cited

U.S. PATENT DOCUMENTS

| | | | | |
|---|---|---|---|---|
| 2021/0045181 | A1* | 2/2021 | Li | H04W 72/23 |
| 2022/0191777 | A1* | 6/2022 | Corston-Petrie | H04W 76/12 |
| 2022/0297380 | A1* | 9/2022 | Lipowitch | B29C 64/386 |
| 2023/0051733 | A1* | 2/2023 | Shah | H04W 72/56 |
| 2023/0105168 | A1* | 4/2023 | Nakamura | H04L 45/74 370/389 |

FOREIGN PATENT DOCUMENTS

| | | | | |
|---|---|---|---|---|
| CN | 109121185 A | * | 1/2019 | |
| CN | 112039699 A | * | 12/2020 | H04L 41/0893 |
| CN | 113727386 A | * | 11/2021 | |
| JP | 6575260 B2 | | 9/2019 | |

* cited by examiner

*Primary Examiner* — Ruolei Zong
(74) *Attorney, Agent, or Firm* — Birch, Stewart, Kolasch & Birch, LLP (57) ABSTRACT

A resource allocation device includes a slice request acquisition unit that receives a slice request including information indicating a request value range and a priority level for each of plural attributes of a slice; a request value selection unit that holds a request value selection policy table showing how to select a request value for each of the plural attributes from the request value range on the basis of the priority level and selects the request value for each of the plural attributes of the slice on the basis of request value selection policy indicated by the request value selection policy table; and a resource allocation unit that allocates a resource to the slice on the basis of the request value.

10 Claims, 11 Drawing Sheets

| ITEM | | | VALUE |
|---|---|---|---|
| SLICE ID | | | 1 |
| SLICE CREATION TIME | | | 2021/9/17 9:00 |
| SLICE DELETION TIME | | | 2021/9/17 12:00 |
| CONNECTION INFORMATION | CONNECTION DEVICES | | UPPER-LEVEL DEVICE |
| | | | FIRST LOWER-LEVEL DEVICE |
| | PERFORMANCE REQUIREMENT INFORMATION | ATTRIBUTE | LATENCY |
| | | MINIMUM REQUEST VALUE | 250 μs |
| | | MAXIMUM REQUEST VALUE | 200 μs |
| | | PRIORITY LEVEL | 1 |
| | PERFORMANCE REQUIREMENT INFORMATION | ATTRIBUTE | BANDWIDTH |
| | | MINIMUM REQUEST VALUE | 10 Mbps |
| | | MAXIMUM REQUEST VALUE | 30 Mbps |
| | | PRIORITY LEVEL | 2 |
| | PERFORMANCE REQUIREMENT INFORMATION | ATTRIBUTE | OPERATION RATE |
| | | MINIMUM REQUEST VALUE | 95% |
| | | MAXIMUM REQUEST VALUE | 97% |
| | | PRIORITY LEVEL | 3 |

| | 32 |
|---|---|
| REQUEST VALUE SELECTION POLICY | |

| EXECUTION STEP | EXECUTION CONTENT |
|---|---|
| 1 | SELECT REQUEST VALUE FOR EACH ATTRIBUTE OF NEW SLICE AS FOLLOWS.<br>REQUEST VALUE FOR ATTRIBUTE X WITH PRIORITY LEVEL 1: VALUE WITH REQUEST CLASS ID=1<br>REQUEST VALUE FOR ATTRIBUTE Y WITH PRIORITY LEVEL 2: VALUE WITH REQUEST CLASS ID=2<br>REQUEST VALUE FOR ATTRIBUTE Z WITH PRIORITY LEVEL 3: VALUE WITH REQUEST CLASS ID=3 |
| 2 | AMONG RESERVED SLICES WITH PRIORITY LEVEL 2 FOR ATTRIBUTE X FOR WHICH NEW SLICE HAS PRIORITY LEVEL 1, PERFORM FOLLOWING REQUEST VALUE RESELECTION FOR ATTRIBUTE X OF RESERVED SLICE IN ORDER OF DECREASING SLICE SATISFACTION SCORE.<br>REQUEST VALUE FOR ATTRIBUTE X WITH PRIORITY LEVEL 2: VALUE WITH REQUEST CLASS ID=3 |
| 3 | RESELECT REQUEST VALUE FOR EACH ATTRIBUTE OF NEW SLICE AS FOLLOWS.<br>REQUEST VALUE FOR ATTRIBUTE Y WITH PRIORITY LEVEL 2: VALUE WITH REQUEST CLASS ID=3 |
| 4 | AMONG RESERVED SLICES WITH PRIORITY LEVEL 2 FOR ATTRIBUTE Y FOR WHICH NEW SLICE HAS PRIORITY LEVEL 2, PERFORM FOLLOWING REQUEST VALUE RESELECTION FOR ATTRIBUTE Y OF RESERVED SLICE IN ORDER OF DECREASING SLICE SATISFACTION SCORE.<br>REQUEST VALUE FOR ATTRIBUTE Y WITH PRIORITY LEVEL 2: VALUE WITH REQUEST CLASS ID=3 |

FIG.5

| SLICE ID | ATTRIBUTE | REQUEST CLASS ID | | |
|---|---|---|---|---|
| | | 1 | 2 | 3 |
| 1 | LATENCY | 200 μs | 225 μs | 250 μs |
| | BANDWIDTH | 30 Mbps | 20 Mbps | 10 Mbps |
| | OPERATION RATE | 97% | 96% | 95% |

FIG.6

| SLICE ID | | 1 |
|---|---|---|
| SLICE SATISFACTION SCORE | | 2.38 |
| LATENCY | PRIORITY LEVEL | 1 |
| | SELECTED REQUEST CLASS ID | 1 |
| | SELECTED REQUEST VALUE | 200 μs |
| | ALLOCATED VALUE | 200 μs |
| BANDWIDTH | PRIORITY LEVEL | 2 |
| | SELECTED REQUEST CLASS ID | 2 |
| | SELECTED REQUEST VALUE | 20 Mbps |
| | ALLOCATED VALUE | 20 Mbps |
| OPERATION RATE | PRIORITY LEVEL | 3 |
| | SELECTED REQUEST CLASS ID | 3 |
| | SELECTED REQUEST VALUE | 95% |
| | ALLOCATED VALUE | 95% |

| SLICE ID | ATTRIBUTE | REQUEST CLASS ID | | |
|---|---|---|---|---|
| | | 1 | 2 | 3 |
| 1 | LATENCY | 200 μs | 225 μs | 250 μs |
| | BANDWIDTH | 30 Mbps | 20 Mbps | 10 Mbps |
| | OPERATION RATE | 97% | 96% | 95% |
| 2 | LATENCY | 100 μs | 200 μs | 300 μs |
| | BANDWIDTH | 40 Mbps | 30 Mbps | 20 Mbps |
| | OPERATION RATE | 99% | 98.5% | 98% |
| 3 | LATENCY | 190 μs | 200 μs | 210 μs |
| | BANDWIDTH | 60 Mbps | 55 Mbps | 50 Mbps |
| | OPERATION RATE | 99% | 98% | 97% |

FIG.10

| SLICE ID | | 1 | 2 | 3 |
|---|---|---|---|---|
| SLICE SATISFACTION SCORE | | 2.38 | 2.35 | 1.83 |
| LATENCY | PRIORITY LEVEL | 1 | 2 | 2 |
| | SELECTED REQUEST CLASS ID | 1 | 2 | 2 |
| | SELECTED REQUEST VALUE | 200 $\mu$s | 200 $\mu$s | 200 $\mu$s |
| | ALLOCATED VALUE | 200 $\mu$s | 200 $\mu$s | 200 $\mu$s |
| BANDWIDTH | PRIORITY LEVEL | 2 | 1 | 3 |
| | SELECTED REQUEST CLASS ID | 2 | 1 | 3 |
| | SELECTED REQUEST VALUE | 20 Mbps | 40 Mbps | 50 Mbps |
| | ALLOCATED VALUE | 20 Mbps | 40 Mbps | 50 Mbps |
| OPERATION RATE | PRIORITY LEVEL | 3 | 3 | 1 |
| | SELECTED REQUEST CLASS ID | 3 | 3 | 1 |
| | SELECTED REQUEST VALUE | 95% | 98% | 99% |
| | ALLOCATED VALUE | 95% | 98% | 99% |

FIG.11

| ITEM | | | VALUE |
|---|---|---|---|
| SLICE ID | | | 4 |
| SLICE CREATION TIME | | | 2021/9/17 9:00 |
| SLICE DELETION TIME | | | 2021/9/17 12:00 |
| CONNECTION INFORMATION | CONNECTION DEVICES | | UPPER-LEVEL DEVICE |
| | | | FIRST LOWER-LEVEL DEVICE |
| | PERFORMANCE REQUIREMENT INFORMATION | ATTRIBUTE | LATENCY |
| | | MINIMUM REQUEST VALUE | 300 $\mu$s |
| | | MAXIMUM REQUEST VALUE | 200 $\mu$s |
| | | PRIORITY LEVEL | 1 |
| | PERFORMANCE REQUIREMENT INFORMATION | ATTRIBUTE | BANDWIDTH |
| | | MINIMUM REQUEST VALUE | 10 Mbps |
| | | MAXIMUM REQUEST VALUE | 30 Mbps |
| | | PRIORITY LEVEL | 2 |
| | PERFORMANCE REQUIREMENT INFORMATION | ATTRIBUTE | OPERATION RATE |
| | | MINIMUM REQUEST VALUE | 98% |
| | | MAXIMUM REQUEST VALUE | 99% |
| | | PRIORITY LEVEL | 3 |

RESOURCE ALLOCATION DEVICE AND RESOURCE ALLOCATION METHOD

CROSS-REFERENCE TO RELATED APPLICATION

This application is a continuation application of International Application PCT/JP2021/045848, filed on Dec. 13, 2021, and designating the U.S., the entire contents of which are incorporated herein by reference.

BACKGROUND OF THE INVENTION

1. Field of the Invention

The present disclosure relates to a resource allocation device and a resource allocation method for allocating communication resources to logical networks.

2. Description of the Related Art

In recent years, with diversification of services, there has been a demand for network architectures that meet requirements of various services. In order to realize such networks, methods of building slices, logically divided virtual networks, on one physical network have been considered. The slices are implemented by dividing the physical network into the plural logical networks and allocating communication resources that meet requirements of a service to each of the logical networks. The communication resources are simply described as "resources" below.

A problem with building plural slices on one physical network is that a new slice cannot be reserved when resources are insufficient. To deal with this problem, Japanese Patent No. 6575260 proposes a technique of calculating a bandwidth that can be reduced from reserved slices on the basis of statistical information on a use bandwidth associated with users of the reserved slices and assigning a bandwidth for a new slice to a bandwidth that has become available by the reduction of the reducible bandwidth.

However, a problem with the technique disclosed in Japanese Patent No. 6575260 is that when no statistical information can be obtained, such as before slice operation begins, the reducible bandwidth cannot be calculated, thus not enabling reservation of a new slice.

The present disclosure has been made in view of the above, and an object of the present disclosure is to obtain a resource allocation device that increases a possibility of reserving a new slice even when statistical information cannot be obtained.

SUMMARY OF THE INVENTION

In order to solve the above-mentioned problem and achieve the object, a resource allocation device according to the present disclosure includes: a slice request acquisition unit to receive a slice request including information indicating a request value range and a priority level for each of plural attributes of a slice; a request value selection unit to hold a request value selection policy table that shows how to select a request value for each of the plural attributes from the request value range indicated in the slice request received by the slice request acquisition unit on a basis of the priority level indicated in the slice request and select a request value for each of the plural attributes of the slice on a basis of request value selection policy indicated by the request value selection policy table; and a resource allocation unit to allocate a resource to the slice on a basis of the request value that the request value selection unit has selected for each of the plural attributes.

DETAILED DESCRIPTION OF THE PREFERRED EMBODIMENTS

With reference to the drawings, a detailed description is hereinafter provided of resource allocation devices and resource allocation methods according to embodiments.

First Embodiment

Figure 1:
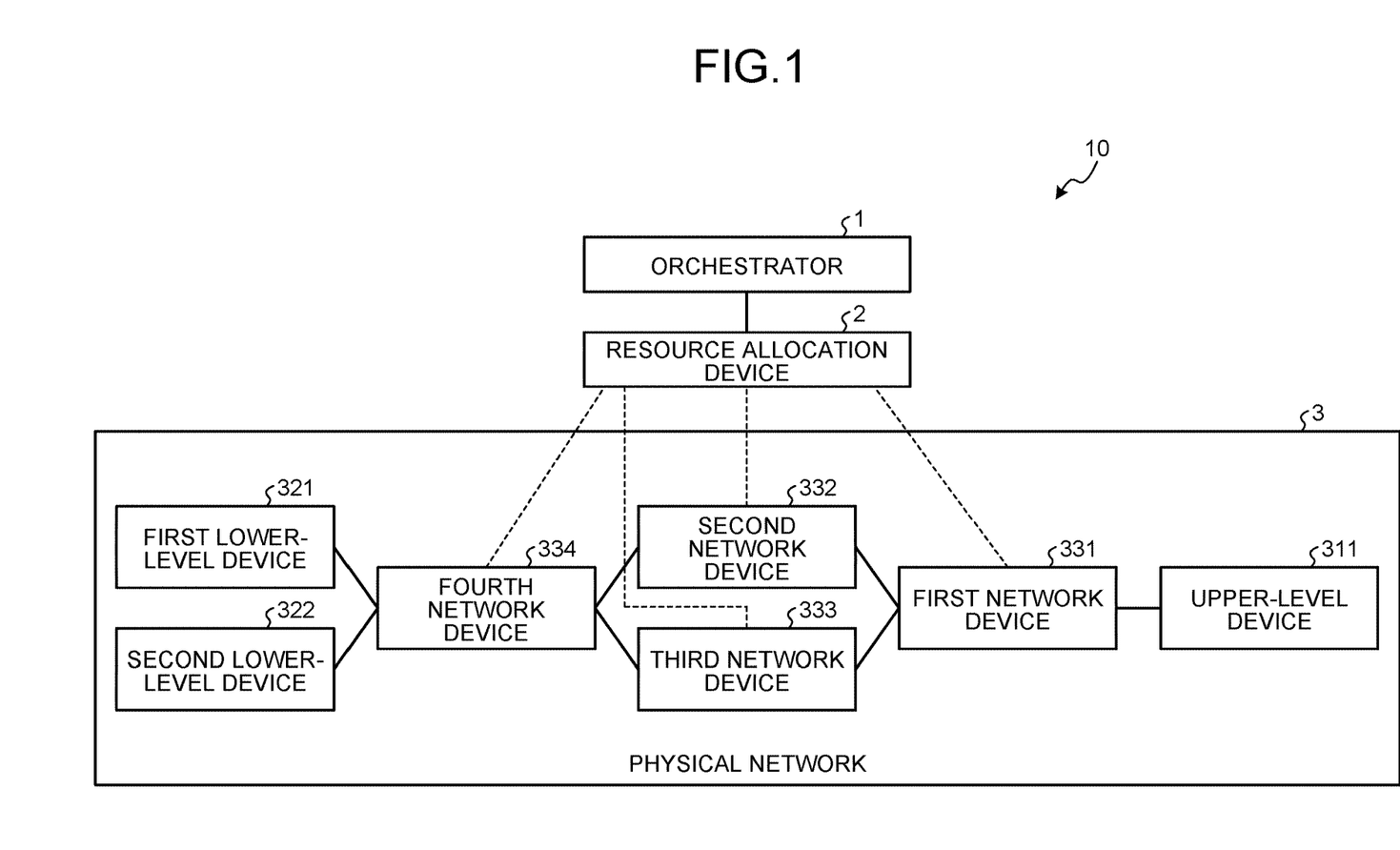
FIG. 1 is a diagram illustrating a configuration of a communication system according to a first embodiment.

FIG. 1 is a diagram illustrating a configuration of a communication system 10 according to a first embodiment. The communication system 10 includes an orchestrator 1, a resource allocation device 2, and a physical network 3. The physical network 3 includes an upper-level device 311, a first lower-level device 321, a second lower-level device 322, a first network device 331, a second network device 332, a third network device 333, and a fourth network device 334.

The upper-level device 311 is, for example, a server device. The first and second lower-level devices 321 and 322 are, for example, client devices. The physical network 3 may include two or more upper-level devices. As for the lower-level devices, the physical network 3 may include only one lower-level device or three or more lower-level devices. Furthermore, the network devices included in the physical network 3 are not limited to four in number.

Figure 2:
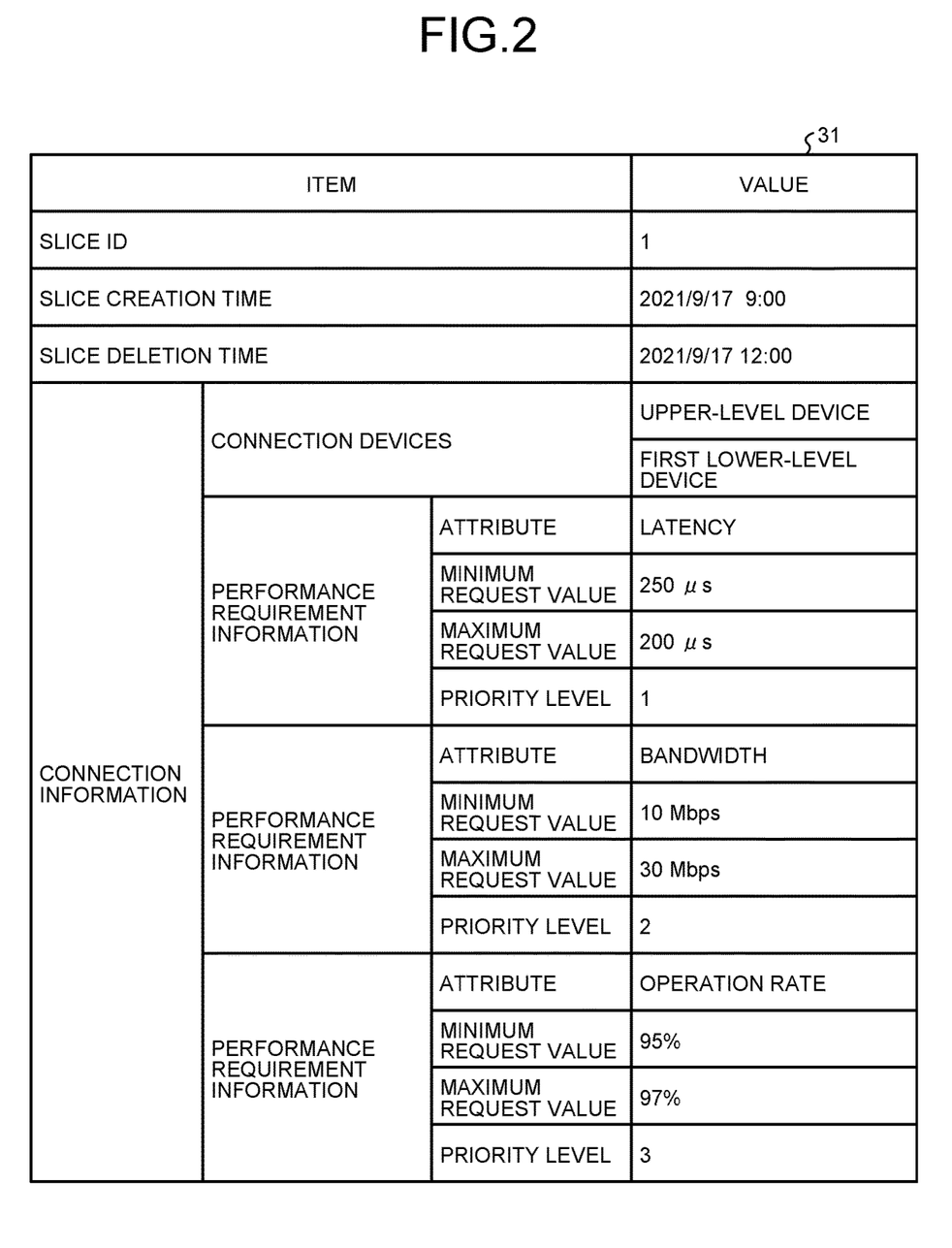
FIG. 2 is a diagram illustrating a slice request according to the first embodiment.

The orchestrator 1 has a function of transmitting a slice request 31 to the resource allocation device 2. The slice request 31 is an interface that requests the resource allocation device 2 to reserve slice creation, update, or deletion. FIG. 2 is a diagram illustrating the slice request 31 according to the first embodiment. When requesting the slice creation, the slice request 31 includes information indicating a slice identification (ID) that is an identifier of a slice to be created; information indicating slice creation time that is time at which the slice to be created is created; information indicating slice deletion time that is time at which the slice to be created is deleted; and one or more pieces of connection information for the slice creation.

Each piece of connection information includes information indicating connection devices and one or more pieces of performance requirement information. Each piece of performance requirement information includes information indicating an attribute, a minimum request value, a maximum request value, and a priority level. The attribute is a performance-related item, such as latency, a bandwidth, an operation rate, or a packet loss rate. The attribute is not limited to the latency, the bandwidth, the operation rate, or the packet loss rate. In the first embodiment, three attributes are specified: the latency, the bandwidth, and the operation rate. For each of the attributes, the minimum request value represents a minimally required request value, with the maximum request value representing a best-required request value.

The priority level represents a priority level of each attribute. In the first embodiment, the smaller a value of the priority level, the higher the priority. In other words, the priority level valued at 1 refers to the highest priority. In the first embodiment, the priority level of the attribute "latency" is 1, the priority level of the attribute "bandwidth" is 2, and the priority level of the attribute "operation rate" is 3. The priority level may be uniquely specified for each attribute. The same priority level may be specified for plural attributes as in a case of specifying priority level 1 for the attribute "latency", priority level 1 for the attribute "bandwidth", and priority level 2 for the attribute "operation rate".

The resource allocation device 2 has functions of receiving the slice request 31 from the orchestrator 1, allocating resources that satisfy the request to the slice on the basis of the received slice request 31, and notifying the physical network 3 of the allocated resources.

Figure 3:
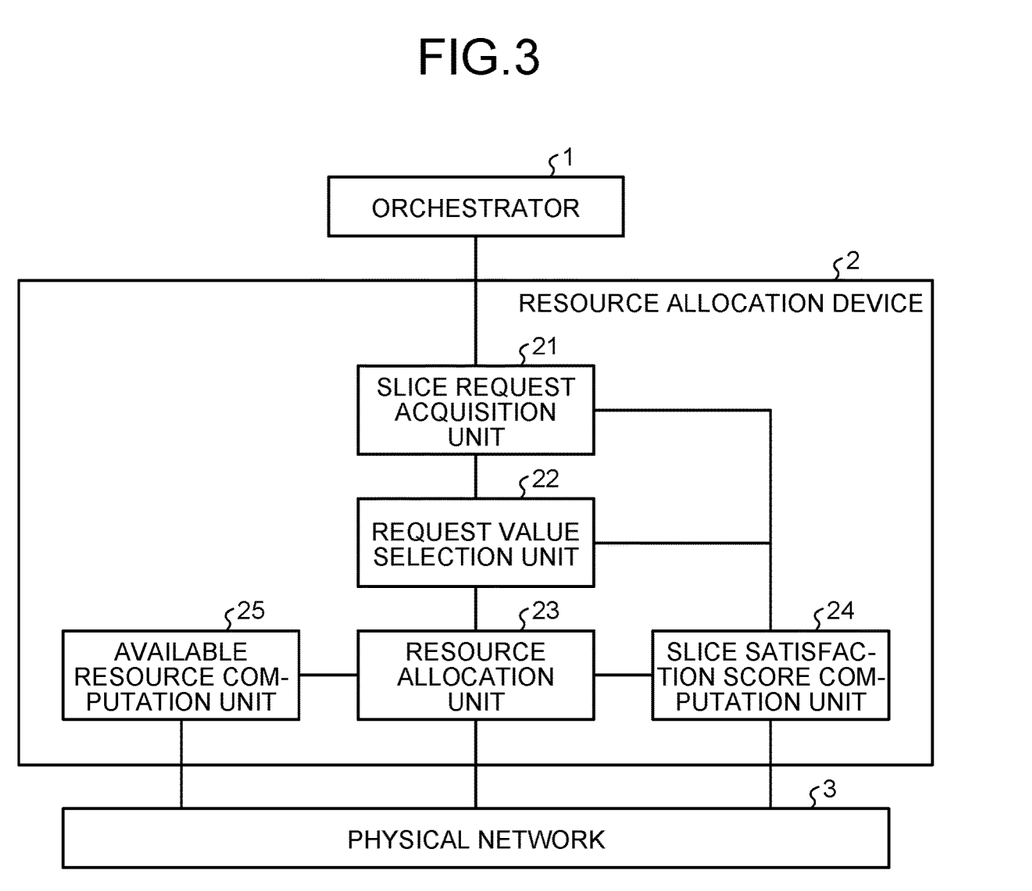
FIG. 3 is a functional configuration diagram of a resource allocation device according to the first embodiment.

FIG. 3 is a functional configuration diagram of the resource allocation device 2 according to the first embodiment. The orchestrator 1 and the physical network 3 are also illustrated in FIG. 3. The resource allocation device 2 includes a slice request acquisition unit 21, a request value selection unit 22, a resource allocation unit 23, a slice satisfaction score computation unit 24, and an available resource computation unit 25.

The slice request acquisition unit 21 has the function of receiving the slice request 31 from the orchestrator 1. More specifically, the slice request acquisition unit 21 receives the slice request 31, which includes information indicating a request value range and the priority level for each of plural attributes of the slice.

Figure 4:
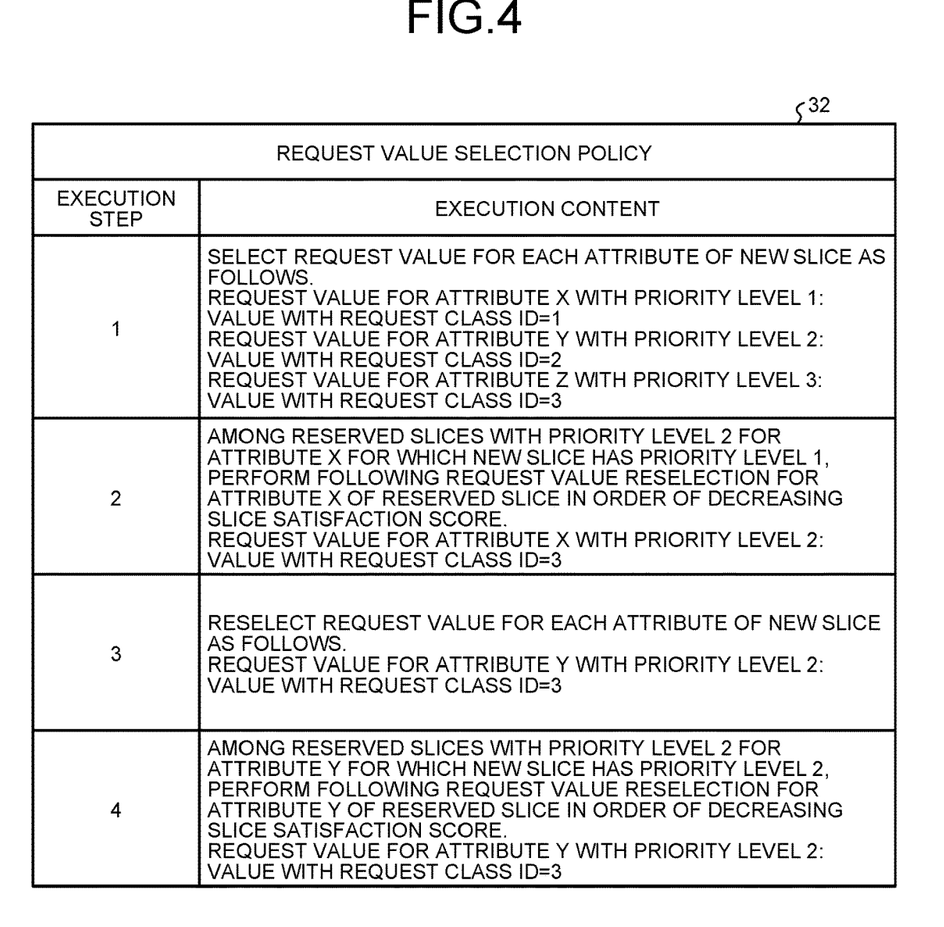
FIG. 4 is a diagram illustrating a request value selection policy table according to the first embodiment.

The request value selection unit 22 has a function of holding a request value selection policy table 32. The request value selection policy table 32 is a preset table indicating policy for selecting a request value for each attribute in each slice. FIG. 4 is a diagram illustrating the request value selection policy table 32 according to the first embodiment. The request value selection policy table 32 includes information indicating execution steps and information indicating execution contents. The execution steps indicate an execution order of the plural execution contents. The execution contents indicate specific methods for selecting request values.

Figure 5:
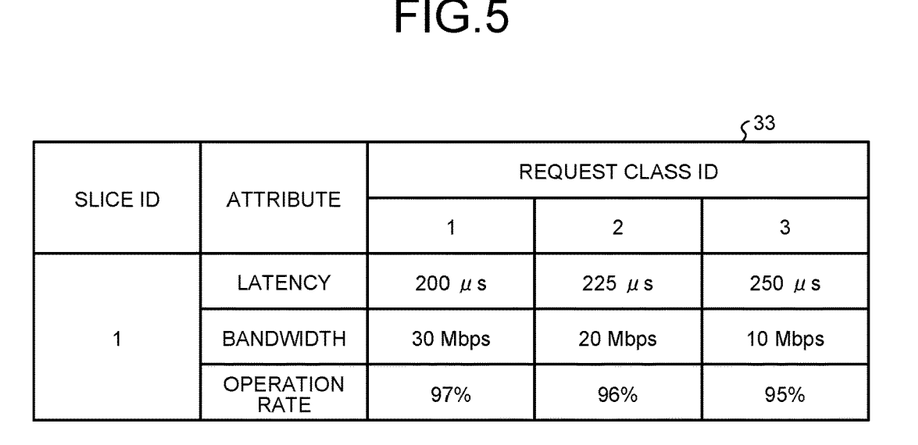
FIG. 5 is a diagram illustrating a request value management table according to the first embodiment.

The request value selection unit 22 further has a function of preparing a request value management table 33 for classifying and managing request values based on the request value range for each of the plural attributes. The request value management table 33 is a table to be used for classifying and managing the request values from within the request value range for each attribute. FIG. 5 is a diagram illustrating the request value management table 33 according to the first embodiment. The request value management table 33 includes information indicating the slice ID, information indicating the attributes, and information indicating the request values with request class IDs. A request class count, indicating how many classifications there are, is preset to a value greater than or equal to 2. In the first embodiment, the request class count is 3. As for the request class IDs, the request class IDs are prepared to be equal in number to the request class count. In the first embodiment, the smaller a value of the request class ID, the higher the performance.

The request value selection unit 22 further has a function of performing the classification based on at least one threshold specified for each of the plural attributes in preparing the request value management table 33. The function of the request value selection unit 22 is to set the request values for the request class IDs on the basis of the request class count, the minimum request value, and the maximum request value in preparing the request value management table 33. For example, the request value selection unit 22 may set the maximum request value for request class ID 1, a median value between the maximum and minimum request values for request class ID 2, and the minimum request value for request class ID 3. The threshold for the request value may be preset for each of request classes of each attribute. In that case, the request value selection unit 22 may set the request value for each request class ID on the basis of the threshold.

The request value selection unit 22 further has a function of selecting request values for each slice on the basis of the request value selection policy table 32 and notifying the resource allocation unit 23 of the selected request values. The request value selection unit 22 selects the request values in accordance with the execution content of execution step 1 indicated in the request value selection policy table 32 and notifies the resource allocation unit 23 of the selected request values. When notified by the resource allocation unit 23 that resource allocation is not possible, the request value selection unit 22 performs selection in accordance with the execution content of execution step 2, which is the next execution step, and notifies the resource allocation unit 23 of a selected request value. As described above, when notified that resource allocation is not possible, the request value selection unit 22 repeats the request value selection in the execution order until all the execution contents are carried out.

More specifically, the request value selection unit 22 holds the request value selection policy table 32 that shows how to select a request value for each of the plural attributes of the slice from the request value range, which is indicated in the slice request 31 received by the slice request acquisition unit 21, on the basis of the priority level, which is indicated in the slice request 31. The request value selection unit 22 selects the request value for each of the plural attributes of the slice on the basis of the request value selection policy indicated by the request value selection policy table 32.

Figure 6:
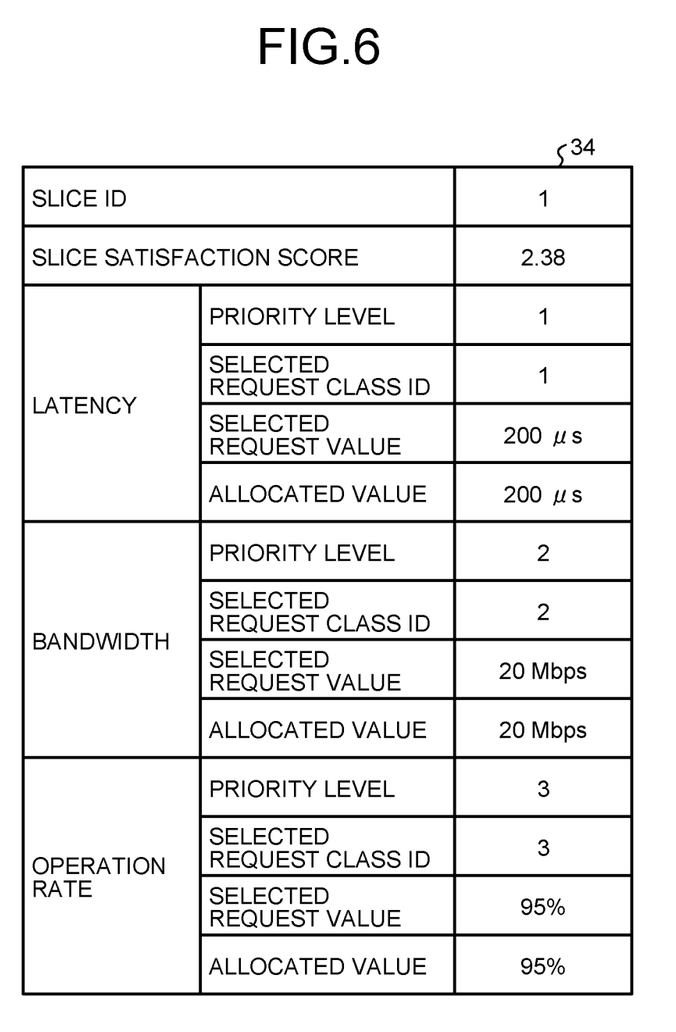
FIG. 6 is a diagram illustrating a slice management table according to the first embodiment.

The resource allocation unit 23 has the function of allocating the resources to the slice on the basis of the request value that the request value selection unit 22 has selected for each of the plural attributes. More specifically, the function of the resource allocation unit 23 is to determine, upon receiving the request value selected by the request value selection unit 22, whether or not a resource that satisfies the selected request value can be allocated, using information on available resources, allocate the resource to the slice after determining that the resource can be allocated, and add information to a slice management table 34. FIG. 6 is a diagram illustrating the slice management table 34 according to the first embodiment. The slice management table 34 includes information indicating the slice ID, information indicating a slice satisfaction score, and information indicating the priority level, a selected request class ID, a selected request value, and an allocated value for each attribute. The slice satisfaction score represents a degree of resource allocation with respect to the minimum or maximum request value specified in the slice request 31. The slice satisfaction score also takes the priority level of each attribute into consideration.

As for the priority level, a value specified in the slice request 31 is registered. As for the selected request class ID and the selected request value, values selected by the request value selection unit 22 are registered. As for the allocated value, a value that has been allocated is registered. As for the slice satisfaction score, a value computed by a method to be described later is registered. When resource allocation is not possible, the resource allocation unit 23 notifies the request value selection unit 22 that the resource allocation is not possible.

The slice satisfaction score computation unit 24 has a function of computing the slice satisfaction score, which is a satisfaction score of the slice, on the basis of the request value ranges and the priority levels that are indicated in the slice request 31 received by the slice request acquisition unit 21, along with the allocated values with respect to the request value ranges. More specifically, the function of the slice satisfaction score computation unit 24 is to compute the slice satisfaction score for each slice, taking into consideration the allocated values with respect to the request value ranges. For example, the slice satisfaction score computation unit 24 uses Formula (1) below to compute the slice satisfaction score $S_{sliceID}$.

Formula 1

$$S_{sliceID} = \sum_{i=1}^{n} \left( \alpha_j \times \frac{VA_i}{VR_i} \right) \quad (1)$$

In Formula (1), n represents the number of attributes, i represents the attribute, $VA_i$ represents the allocated value of each attribute, $VR_i$ represents the minimum request value for each attribute, j represents the priority level of each attribute, and $\alpha_j$ represents a coefficient corresponding to each priority level. However, if the attribute is the latency, the numerator and the denominator are swapped. While the slice satisfaction score $S_{sliceID}$ is computed as a ratio of the allocated value to the minimum request value according to Formula (1), the slice satisfaction score $S_{sliceID}$ may be computed as a ratio of the allocated value to the maximum request value. As indicated above, when computing the slice satisfaction score with Formula (1), the slice satisfaction score computation unit 24 multiples the ratio of the allocated value to the lower limit of the request value range by the coefficient corresponding to the priority level to determine a satisfaction score of each of the plural attributes and adds up the satisfaction scores of the plural attributes to obtain the slice satisfaction score.

The available resource computation unit 25 has functions of obtaining information on available resources from the physical network 3, computing available resource information, and managing the available resource information.

Figure 7:
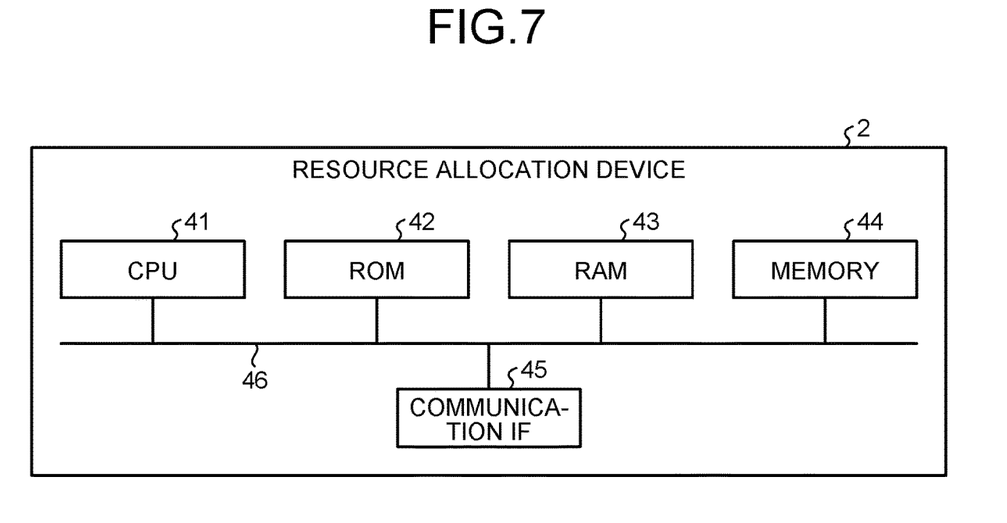
FIG. 7 is a hardware configuration diagram of the resource allocation device according to the first embodiment.

FIG. 7 is a hardware configuration diagram of the resource allocation device 2 according to the first embodiment. The resource allocation device 2 includes a central processing unit (CPU) 41, a read-only memory (ROM) 42, a random access memory (RAM) 43, a memory 44, a communication interface (IF) 45, and a bus 46. The CPU 41, the ROM 42, the RAM 43, the memory 44, and the communication IF 45 are connected by the bus 46. The CPU 41 takes charge of overall processing and control of the resource allocation device 2. The ROM 42 stores programs such as a boot program, a communications program, and a data analysis program. The RAM 43 is used as a work area for the CPU 41. The memory 44 is a semiconductor memory, for example. The communication IF 45 is connected to the orchestrator 1 and the physical network 3.

The functions of the resource allocation device 2 are implemented with the CPU 41 and software, firmware, or a combination of software and firmware. The software and the firmware are described as programs and are stored in the memory 44. The CPU 41 reads and executes the programs stored in the memory 44 to implement the functions of the resource allocation device 2.

Figure 8:
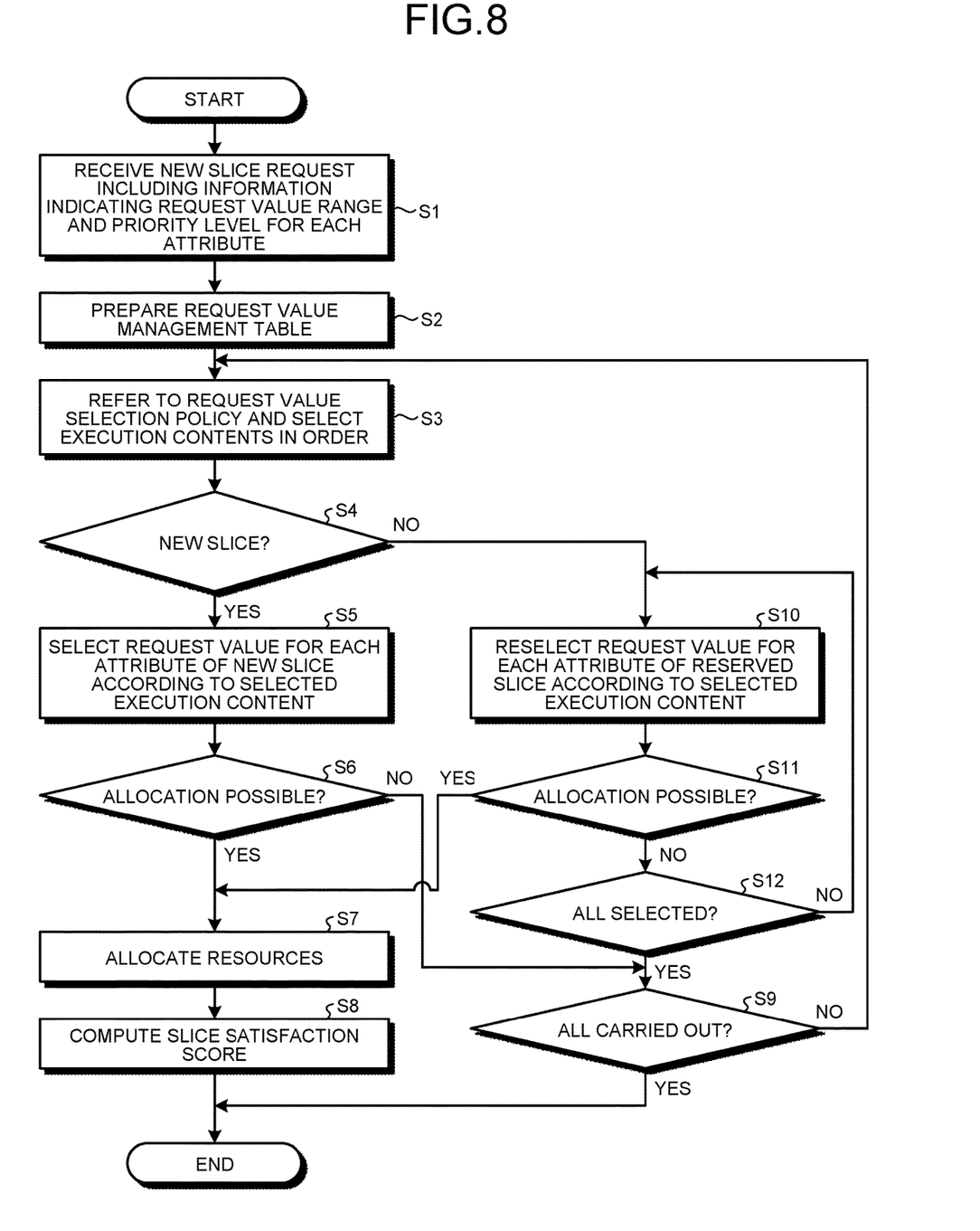
FIG. 8 is a flowchart illustrating a procedure of resource allocation operation to be performed by the resource allocation device according to the first embodiment.

With reference to FIG. 8, a description is provided next of a resource allocation flow according to the first embodiment. FIG. 8 is a flowchart illustrating a procedure of resource allocation operation to be performed by the resource allocation device 2 according to the first embodiment. Assume that the request value selection policy indicated by the request value selection policy table 32 in FIG. 4 has been preset. The request value selection policy is such that for a new slice, a request value for attribute X with priority level 1 is set to a request value with request class ID 1, a request value for attribute Y with priority level 2 is set to a request value with request class ID 2, and a request value for attribute Z with priority level 3 is set to a request value with request class ID 3 and that if the new slice cannot be accepted, the request value for the new slice or a reserved slice is lowered from the request value with priority level 2 to a request value with request class ID 3.

First, the resource allocation device 2 receives from the orchestrator 1 a new slice request 31 that includes information indicating the request value range for each attribute and information indicating the priority levels (S1). Assume that the slice request 31 received by the resource allocation device 2 is the one with slice ID 1 in FIG. 2.

Next, the resource allocation device 2 prepares the request value management table 33 (S2). Specifically, for the attribute "latency" of the slice with slice ID 1, the resource allocation device 2 sets the maximum request value, which is 200 µs, for request class ID 1, the median value, which is 225 µs, for request class ID 2, and the minimum request value, which is 250 µs, for request class ID 3. The resource allocation device 2 performs the similar operation for the attribute "bandwidth" and the attribute "operation rate" as the resource allocation device 2 has done for the attribute "latency". The request value management table 33 prepared by the resource allocation device 2 is illustrated in FIG. 5.

Next, the resource allocation device 2 refers to the request value selection policy table 32 and selects the execution contents in order (S3). The execution content of execution step 1 is selected first.

Next, the resource allocation device 2 determines whether or not the target slice for which the execution content has been selected is a new slice (S4). If the resource allocation device 2 determines that the target slice for which the execution content has been selected is a new slice (Yes at S4), the resource allocation device 2 selects a request value for each attribute of the new slice according to the selected execution content (S5). Specifically, according to the execution content of execution step 1, the resource allocation device 2 selects, for the new slice, 200 μs with request class ID 1 as the request value for the attribute "latency" with priority level 1, 20 Mbps with request class ID 2 as the request value for the attribute "bandwidth" with priority level 2, and 95% with request class ID 3 as the request value for the attribute "operation rate" with priority level 3.

Next, the resource allocation device 2 determines, using available resource information, whether or not allocation of a resource that satisfies the request value selected for each attribute is possible (S6). In other words, the resource allocation device 2 determines whether or not the resources that satisfy the selected latency of 200 μs, the selected bandwidth of 20 Mbps, and the selected operation rate of 95% can be allocated. If the resource allocation device 2 determines that the allocation is possible (Yes at S6), the resource allocation device 2 allocates the resources to the new slice (S7) and registers the priority level, the selected request class ID, the selected request value, and the allocated value for each attribute in the slice management table 34 as information of the slice with slice ID 1.

Furthermore, the resource allocation device 2 computes the slice satisfaction score, taking into consideration the allocated values with respect to the request value ranges (S8). If the coefficients corresponding to the priority levels are $\alpha_1=0.3$, $\alpha_2=0.5$, and $\alpha_3=1$, according to Formula (1), the slice satisfaction score is 0.3×(250 μs/200 μs)+0.5×(20 Mbps/10 Mbps)+1×(95%/95%)=2.38. The resource allocation device 2 registers the computed slice satisfaction score in the slice management table 34. FIG. 6 illustrates the slice management table 34 after the registration. Through the above-described operation, reservation of the new slice with slice ID 1 is completed.

Figure 9:
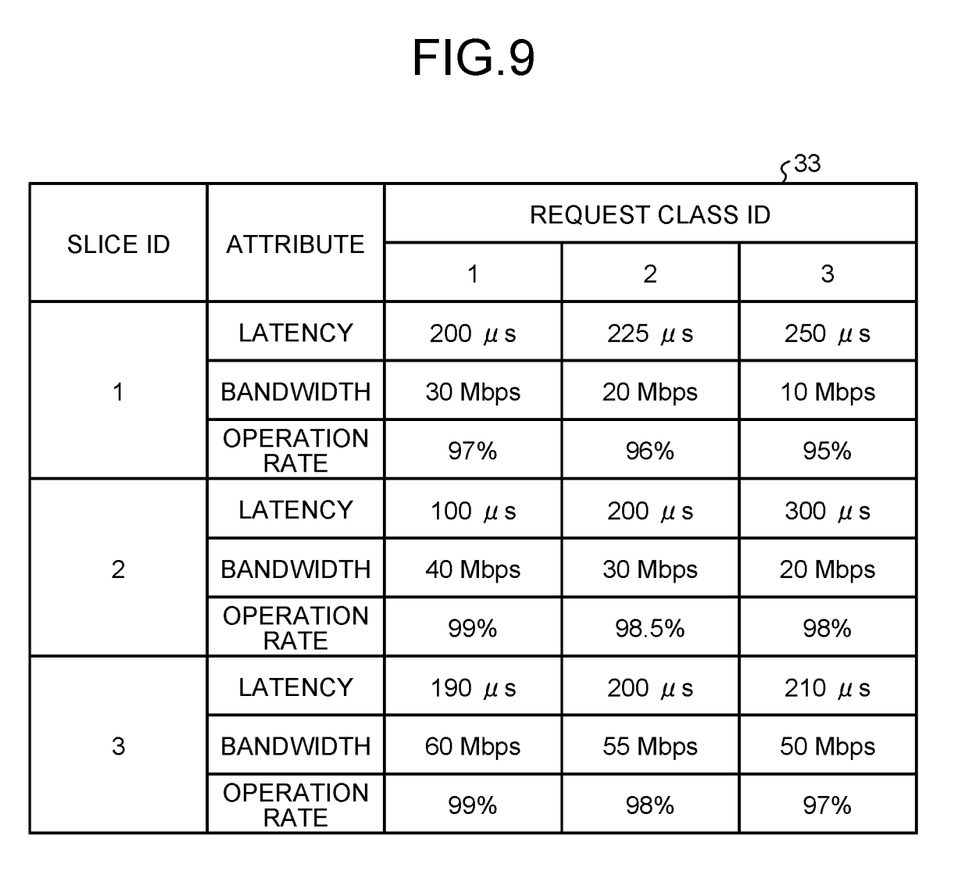
FIG. 9 is a diagram of the request value management table according to the first embodiment, illustrating a state where reservations of new slices with slice IDs 1, 2, and 3 have been completed.
Figure 10:
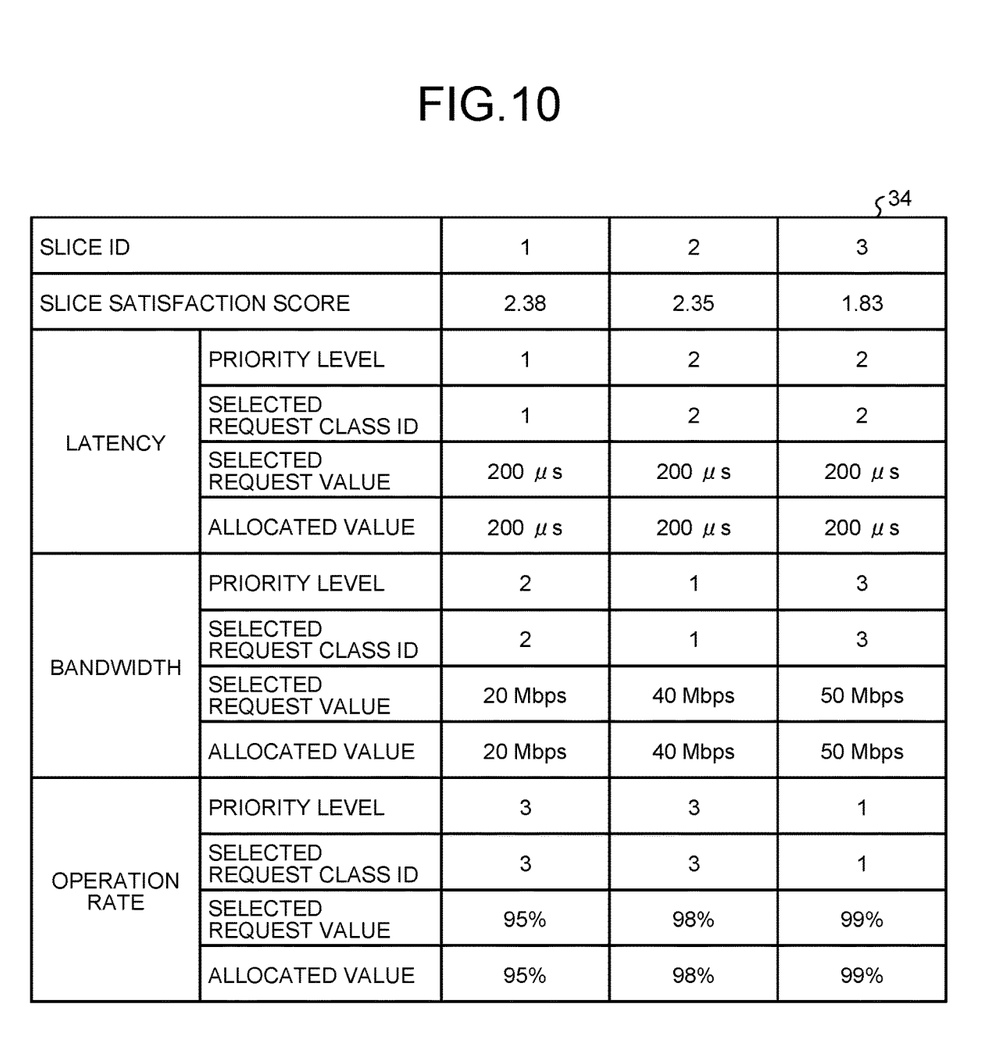
FIG. 10 is a diagram of the slice management table according to the first embodiment, illustrating a state where the reservations of the new slices with slice IDs 1, 2, and 3 have been completed.
Figure 11:
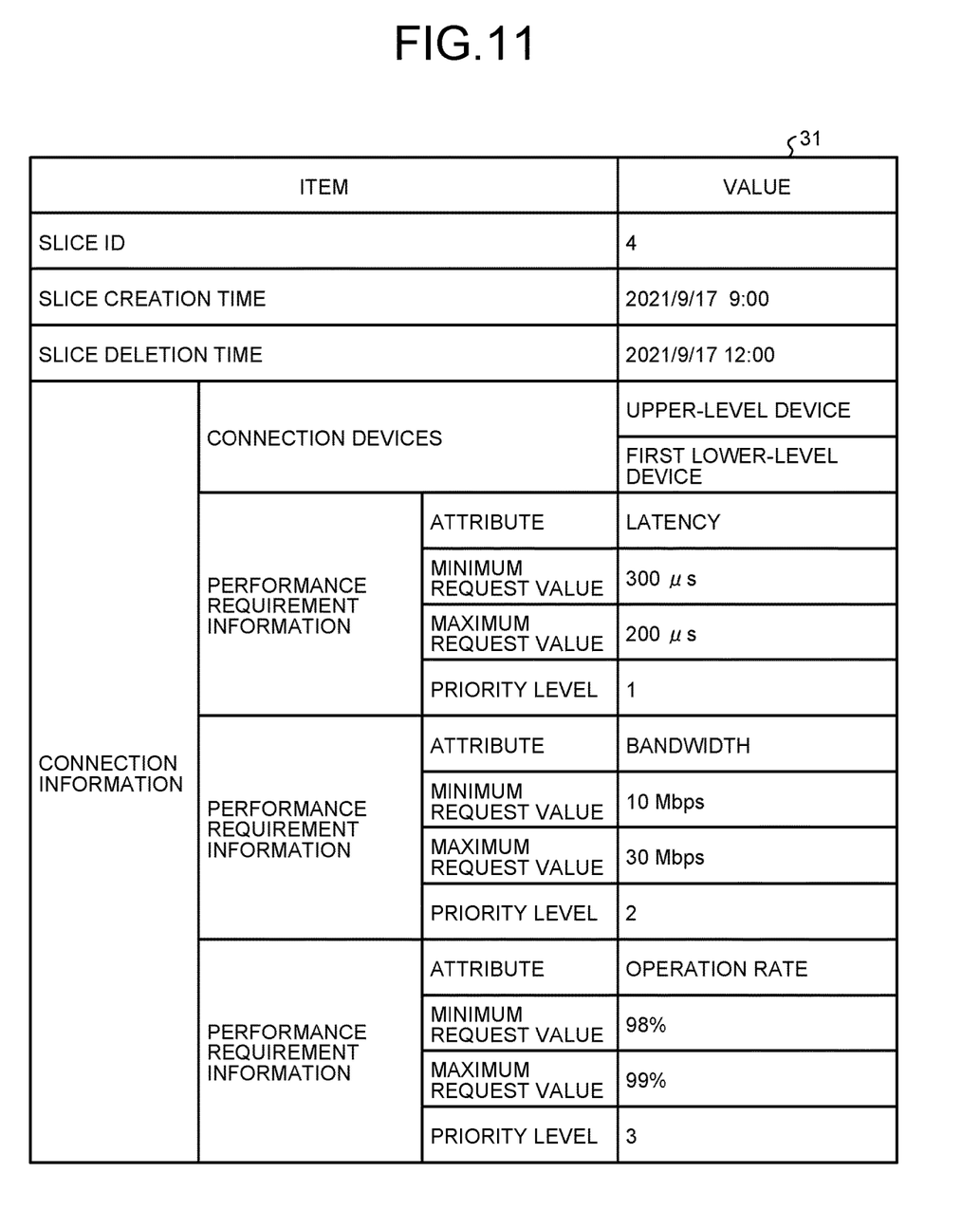
FIG. 11 is a diagram illustrating a slice request for a new slice with slice ID 4 according to the first embodiment.

On the assumption that reservations of new slices with slice IDs 1, 2, and 3 have already been completed, a description is provided of how the resource allocation device 2 operates after determining that resource allocation is not possible (No at S6). FIG. 9 is a diagram of the request value management table 33 according to the first embodiment, illustrating a state where the reservations of the new slices with slice IDs 1, 2, and 3 have been completed. FIG. 10 is a diagram of the slice management table 34 according to the first embodiment, illustrating a state where the reservations of the new slices with slice IDs 1, 2, and 3 have been completed. Assume that as illustrated in FIG. 11, a slice request 31 for a new slice with slice ID 4 has been received by the resource allocation device 2 here. FIG. 11 is a diagram illustrating the slice request 31 for the new slice with slice ID 4 according to the first embodiment.

As in the above-described operation for the slice with slice ID 1, the resource allocation device 2 selects the execution content of execution step 1 in the request value selection policy table 32 for the slice with slice ID 4. If the resource allocation device 2 determines at step S6 that allocation is not possible (No at S6), the resource allocation device 2 determines whether or not all the execution contents in the request value selection policy table 32 have been carried out (S9). If the resource allocation device 2 determines that all the execution contents in the request value selection policy table 32 have not been carried out (No at S9), the resource allocation device 2 returns to step S3 to refer to the request value selection policy table 32 and select the execution content of execution step 2, which is the next execution step (S3). If the resource allocation device 2 determines that all the execution contents in the request value selection policy table 32 have been carried out (Yes at S9), the resource allocation device 2 ends the resource allocation operation.

If the resource allocation device 2 determines that the target slice for which the execution content has been selected is not a new slice (No at S4), the resource allocation device 2 reselects a request value for each attribute of the reserved slice according to the selected execution content (S10). Specifically, regarding the request value for the attribute "latency" with priority level 1 of the new slice with slice ID 4, the resource allocation device 2 first extracts the reserved slices with slice IDs 2 and 3 that have priority level 2 according to the execution content of execution step 2. Next, the resource allocation device 2 selects a slice in order of decreasing slice satisfaction score from the extracted reserved slices.

The slice satisfaction score with slice ID 2 is 2.35, and the slice satisfaction score with slice ID 3 is 1.83. Therefore, the slice with slice ID 2 is selected. In cases where the slice satisfaction scores of the extracted reserved slices are the same, the resource allocation device 2 may select a slice in order of decreasing range between the maximum and minimum request values. The resource allocation device 2 performs a reselection, changing the request value for the attribute "latency" of the selected slice from the current request value with request class ID 2 to the request value with request class ID 3. Specifically, the request value for the attribute "latency" with slice ID 2 is changed from 200 μs to 300 μs.

Next, the resource allocation device 2 computes available resource information that will result when the request value for the reserved slice is changed to the reselected request value and determines, using the computed available resource information, whether or not resource allocation is possible for the new slice with slice ID 4 (S11).

If the resource allocation device 2 determines that the allocation is possible (Yes at S11), the resource allocation device 2 performs the operations of steps S7 and S8 for the new slice and the reserved slice for which the request value has been reselected.

If the resource allocation device 2 determines that the allocation is not possible (No at S11), the resource allocation device 2 determines whether or not all the slices extracted at step S10 have been selected (S12). If the resource allocation device 2 determines that all the slices extracted at step S10 have not been selected (No at S12), the resource allocation device 2 returns to step S10, reselects a request value for the reserved slice with the next highest slice satisfaction score, and performs the subsequent operations. The reserved slice with the next highest slice satisfaction score refers to the slice with slice ID 3.

If the resource allocation device 2 determines that all the slices extracted at step S10 have been selected (Yes at S12), the resource allocation device 2 determines whether or not all the execution contents in the request value selection policy table 32 have been carried out (S9). If the resource allocation device 2 determines that all the execution contents in the request value selection policy table 32 have not been carried out (No at S9), the resource allocation device 2 returns to step S3 to refer to the request value selection policy table 32 and select the execution content of the third execution step, which is the next execution step (S3). If the resource allocation device 2 determines that all the execution contents in the request value selection policy table 32 have been carried out (Yes at S9), no reservation is made for the new slice.

As described above, the resource allocation device 2 according to the first embodiment selects the request value for each of the plural attributes from the request value range indicated in the slice request 31 on the basis of the priority level indicated in the slice request 31 and allocates the resources to the slice on the basis of the selected request values. In other words, the resource allocation device 2 selects the request values based on the priority levels and allocates the resources to the slice on the basis of the selected request values. Therefore, the resource allocation device 2 is capable of increasing a possibility of reserving the new slice even when statistical information cannot be obtained. In addition, the resource allocation device 2 selects the request value while considering the satisfaction score, so the resource allocation device 2 can increase the possibility of reserving the new slice while restraining a decrease in the slice satisfaction score.

The request value selection policy indicated by the request value selection policy table 32 according to the first embodiment has the execution contents that are up to four in number and is such that if the resources cannot be allocated to the new slice, the request value for the attribute with priority level 2 of each of the reserved and new slices is lowered to the request value with request class ID 3, with the request value for the attribute with priority level 1 remaining at the request value with request class ID 1. However, execution contents that lower the request values for the attribute with priority level 1 of the reserved and new slices to the request values with request class ID 2 or 3 may be added. Another method is that in cases where the request class count is greater, the resource allocation device 2 may lower the request value one step at a time or to the minimum request value at once.

The request value selection policy indicated by the request value selection policy table 32 may indicate the setting method of setting, for the new slice, the request value for the first attribute with the highest priority level to the request value of the first class that performs best, the request value for the second attribute with the second-highest priority level to the request value of the second class that performs second best, and the request value for the third attribute with the third-highest priority level to the request value of the third class that performs third best. When the resource allocation is not possible with the request value selected according to the setting method, the request value selection policy may indicate the method of changing, for the reserved slice, the request value for the first attribute with the priority level other than the highest priority level to the request value of the lower class.

The request value selection unit 22 of the resource allocation device 2 may perform classification consistent with a prespecified class count in preparing the request value management table 33.

Second Embodiment

According to the execution content of execution step 1 in the request value selection policy indicated by the request value selection policy table 32 of the first embodiment, the request class ID to be selected corresponds to the priority level of each attribute of the new slice. Request value selection policy set in a second embodiment includes an execution content of execution step 1, according to which when an available resources capacity is greater than a predetermined threshold, request values for all attributes of a new slice are set to values of a best performing request class with request class ID 1, and execution contents of execution step 2 and subsequent execution steps, according to which request values with request class IDs are reselected to correspond to priority levels.

As described above, the request value selection policy in the second embodiment indicates the method of setting the request values for all the attributes of the new slice to the values of the best performing class when the available resources capacity is greater than the predetermined threshold and reselecting the request values that correspond to the priority levels in cases where resources cannot be allocated. In the second embodiment, when the available resources capacity is greater than the predetermined threshold, the request values with the request class ID that perform better are allocated, thus producing an effect of enabling an increased slice satisfaction score.

Third Embodiment

In contrast to the request value selection policy of the second embodiment, request value selection policy set in a third embodiment includes an execution content of execution step 1, according to which when an available resources capacity is less than a predetermined threshold, request values for all attributes of a new slice are set to values of a lowest performing request class with request class ID 3, and execution contents of execution step 2 and subsequent execution steps, according to which request values with request class IDs that correspond to priority levels are reselected. The third embodiment produces an effect of enabling an increased number of slices when the available resources capacity is less than the predetermined threshold.

Fourth Embodiment

After reselecting a request value for a reserved slice in the method according to the first or second embodiment, the resource allocation device 2 according to a fourth embodiment reselects, if there is an available resources capacity due to reservation cancellation or slice deletion, a request value in reverse order of the execution steps in the request value selection policy indicated by the request value selection policy table 32 and updates resource allocation. As described above, if there is an available resources capacity after the request value for the slice is reselected, the request value selection unit 22 according to the fourth embodiment reselects the request value in the reverse order of the execution steps in the request value selection policy of the first embodiment. The fourth embodiment produces an effect of enabling a higher slice satisfaction score.

Figure 12:
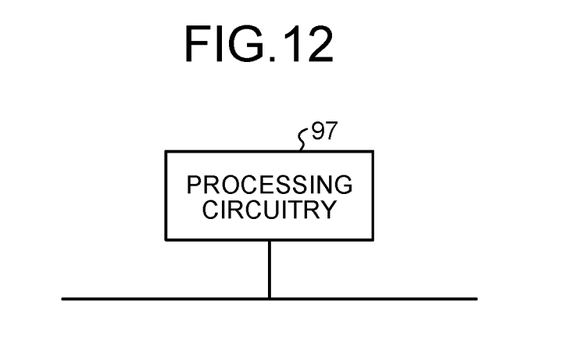
FIG. 12 is a diagram illustrating processing circuitry with which a slice request acquisition unit, a resource allocation unit, a slice satisfaction score computation unit, and an available resource computation unit of the resource allocation device according to the first embodiment are at least partly implemented.

FIG. 12 is a diagram illustrating processing circuitry 97 with which the slice request acquisition unit 21, the resource allocation unit 23, the slice satisfaction score computation unit 24, and the available resource computation unit 25 of the resource allocation device 2 according to the first embodiment are at least partly implemented. In other words, the slice request acquisition unit 21, the resource allocation unit 23, the slice satisfaction score computation unit 24, and the available resource computation unit 25 may be implemented at least in part with the processing circuitry 97.

The processing circuitry 97 is dedicated hardware. The processing circuitry 97 is, for example, a single circuit, a composite circuit, a programmed processor, a parallel programmed processor, an application-specific integrated circuit (ASIC), a field-programmable gate array (FPGA), or a combination of these.

Figure 13:
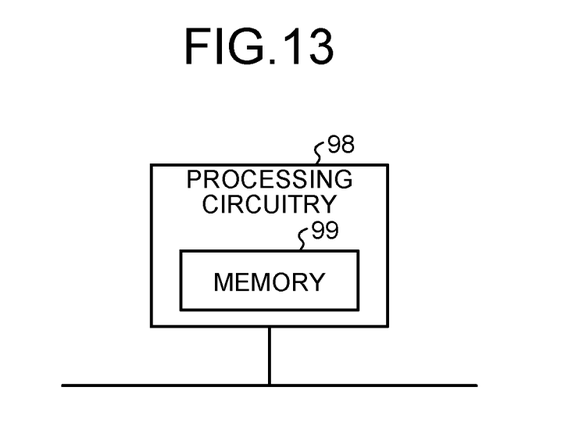
FIG. 13 is a diagram illustrating processing circuitry with which a request value selection unit of the resource allocation device according to the first embodiment is implemented.

FIG. 13 is a diagram illustrating processing circuitry 98 with which the request value selection unit 22 of the resource allocation device 2 according to the first embodiment is implemented. In other words, the request value selection unit 22 may be implemented with the processing circuitry 98. The processing circuitry 98 is dedicated hardware including a memory 99. The memory 99 is, for example, a semiconductor memory and holds the request value selection policy table 32. A portion of the processing circuitry 98 other than the memory 99 is similar to the above-mentioned processing circuitry 97.

Part of the slice request acquisition unit 21, the request value selection unit 22, the resource allocation unit 23, the slice satisfaction score computation unit 24, and the available resource computation unit 25 may be implemented with different dedicated hardware separately from a remaining part.

Part of the plural functions of the slice request acquisition unit 21, the request value selection unit 22, the resource allocation unit 23, the slice satisfaction score computation unit 24, and the available resource computation unit 25 may be implemented with software or firmware, while a remaining part of the plural functions may be implemented with dedicated hardware. As described above, the plural functions of the slice request acquisition unit 21, the request value selection unit 22, the resource allocation unit 23, the slice satisfaction score computation unit 24, and the available resource computation unit 25 are implementable with the hardware, the software, the firmware, or a combination of these.

The slice request acquisition unit 21, the request value selection unit 22, the resource allocation unit 23, the slice satisfaction score computation unit 24, and the available resource computation unit 25 according to each of the second through fourth embodiments may partly or entirely be implemented with processing circuitry. The processing circuitry is similar to the processing circuitry 97 or 98.

The resource allocation device according to the present disclosure produces an effect of increasing a possibility of reserving a new slice even when statistical information cannot be obtained.

The above configurations illustrated in the embodiments are illustrative, can be combined with other techniques that are publicly known, and can be partly omitted or changed without departing from the gist. The embodiments can be combined with each other.

What is claimed is:

1. A resource allocation device comprising:
a slice request acquiring circuitry to receive a slice request including information indicating a request value range and a priority level for each of plural attributes of a slice;
a request value selecting circuitry to hold a request value selection policy table that shows how to select a request value for each of the plural attributes from the request value range indicated in the slice request received by the slice request acquiring circuitry on a basis of the priority level indicated in the slice request and select a request value for each of the plural attributes of the slice on a basis of request value selection policy indicated by the request value selection policy table; and
a resource allocating circuitry to allocate a resource to the slice on a basis of the request value that the request value selecting circuitry has selected for each of the plural attributes.

2. The resource allocation device according to claim 1, wherein
the request value selection policy indicates a setting method of setting, for a new slice, a request value for a first attribute with a highest priority level to a request value of a first class that performs best, a request value for a second attribute with a second-highest priority level to a request value of a second class that performs second best, and a request value for a third attribute with a third-highest priority level to a request value of a third class that performs third best.

3. The resource allocation device according to claim 2, wherein
when resource allocation is not possible with request values selected according to the setting method, the request value selection policy indicates a method of changing, for a reserved slice, a request value for the first attribute with a priority level other than the highest priority level to a request value of a lower class.

4. The resource allocation device according to claim 1, wherein
the request value selecting circuitry prepares a request value management table for classifying and managing request values based on the request value range for each of the plural attributes.

5. The resource allocation device according to claim 1, wherein
the request value selecting circuitry performs classification based on at least one threshold specified for each of the plural attributes in preparing a request value management table.

6. The resource allocation device according to claim 1, wherein
the request value selecting circuitry performs classification consistent with a prespecified class count in preparing a request value management table.

7. The resource allocation device according to claim 1, further comprising a slice satisfaction score computing circuitry to compute a slice satisfaction score on a basis of the request value range and the priority level that are indicated in the slice request received by the slice request acquiring circuitry, along with an allocated value with respect to the request value range, the slice satisfaction score being a satisfaction score of the slice, wherein
the slice satisfaction score computing circuitry multiplies a ratio of the allocated value to a lower limit of the request value range by a coefficient corresponding to a priority level in determining a satisfaction score of each of the plural attributes and adds up a plurality of the satisfaction scores of the plural attributes in obtaining the slice satisfaction score.

8. The resource allocation device according to claim 1, wherein
the request value selection policy indicates a method of setting request values for all attributes of a new slice to values of a best performing class when an available resources capacity is greater than a predetermined threshold and reselecting a request value that corresponds to a priority level when resource allocation is not possible.

9. The resource allocation device according to claim 1, wherein
if there is an available resources capacity after a request value for the slice is reselected, the request value selecting circuitry reselects a request value in reverse order of execution steps in the request value selection policy.

10. A resource allocation method comprising:
a step of receiving a slice request including information indicating a request value range and a priority level for each of plural attributes of a slice;
a step of holding a request value selection policy table that shows how to select a request value for each of the plural attributes from the request value range indicated in the slice request on a basis of the priority level indicated in the slice request received and selecting a request value for each of the plural attributes of the slice on a basis of request value selection policy indicated by the request value selection policy table; and
a step of allocating a resource to the slice on a basis of the request value selected for each of the plural attributes.

* * * * *